United States Patent
Borger et al.

(10) Patent No.: US 8,150,649 B2
(45) Date of Patent: Apr. 3, 2012

(54) METHOD FOR OPERATING AN AUTOMATION SYSTEM

(75) Inventors: Thomas Borger, Klein-Zimmern (DE); Walter Kreb, Schwanheim (DE); Ulrich Lehmann, Wörth (DE); Robert Schwab, Karlsruhe (DE); Hans-Günther Sieberling, Hofheim (DE); Raimund Trockel, Mühltal (DE)

(73) Assignee: Siemens Aktiengesellschaft, Munich (DE)

(*) Notice: Subject to any disclaimer, the term of this patent is extended or adjusted under 35 U.S.C. 154(b) by 956 days.

(21) Appl. No.: 12/086,800

(22) PCT Filed: Dec. 18, 2006

(86) PCT No.: PCT/EP2006/069824
§ 371 (c)(1), (2), (4) Date: Jun. 19, 2008

(87) PCT Pub. No.: WO2007/071643
PCT Pub. Date: Jun. 28, 2007

(65) Prior Publication Data
US 2009/0030532 A1    Jan. 29, 2009

(30) Foreign Application Priority Data
Dec. 21, 2005 (DE) .......... 10 2005 061 212

(51) Int. Cl.
*G05B 19/00*    (2006.01)

(52) U.S. Cl. .......... 702/127; 702/183; 60/773; 60/778; 60/786; 700/287; 700/289; 123/305; 123/479; 123/491; 123/527

(58) Field of Classification Search ............ 702/27, 702/183; 60/776, 734, 790, 772, 773, 778, 60/786, 800, 793; 700/287, 289; 123/305, 123/479, 491, 527, 1 A, 3, 27 GE
See application file for complete search history.

(56) References Cited

U.S. PATENT DOCUMENTS

| | | | |
|---|---|---|---|
| 4,807,161 A * | 2/1989 | Comfort et al. | 702/121 |
| 6,725,419 B1 * | 4/2004 | Barthel et al. | 714/807 |
| 7,760,753 B2 * | 7/2010 | Schultze et al. | 370/442 |
| 7,835,404 B2 * | 11/2010 | Kynast et al. | 370/509 |
| 2004/0250087 A1 * | 12/2004 | Ray et al. | 713/189 |

FOREIGN PATENT DOCUMENTS

| | | |
|---|---|---|
| DE | 19705365 A1 | 8/1998 |
| EP | 1 355 458 A2 | 10/2003 |
| EP | 1 585 266 A2 | 10/2005 |
| WO | WO 02/073138 A1 | 9/2002 |

* cited by examiner

*Primary Examiner* — Carol Tsai

(57) ABSTRACT

There is described a method for operating an automation system which comprises at least two measuring modules, each connected to a higher order processing unit in order to communicate therewith. The higher order processing unit is informed of an event that is recorded by one of the at least two measuring modules. The processing unit then informs any available measuring module of the event.

9 Claims, 2 Drawing Sheets

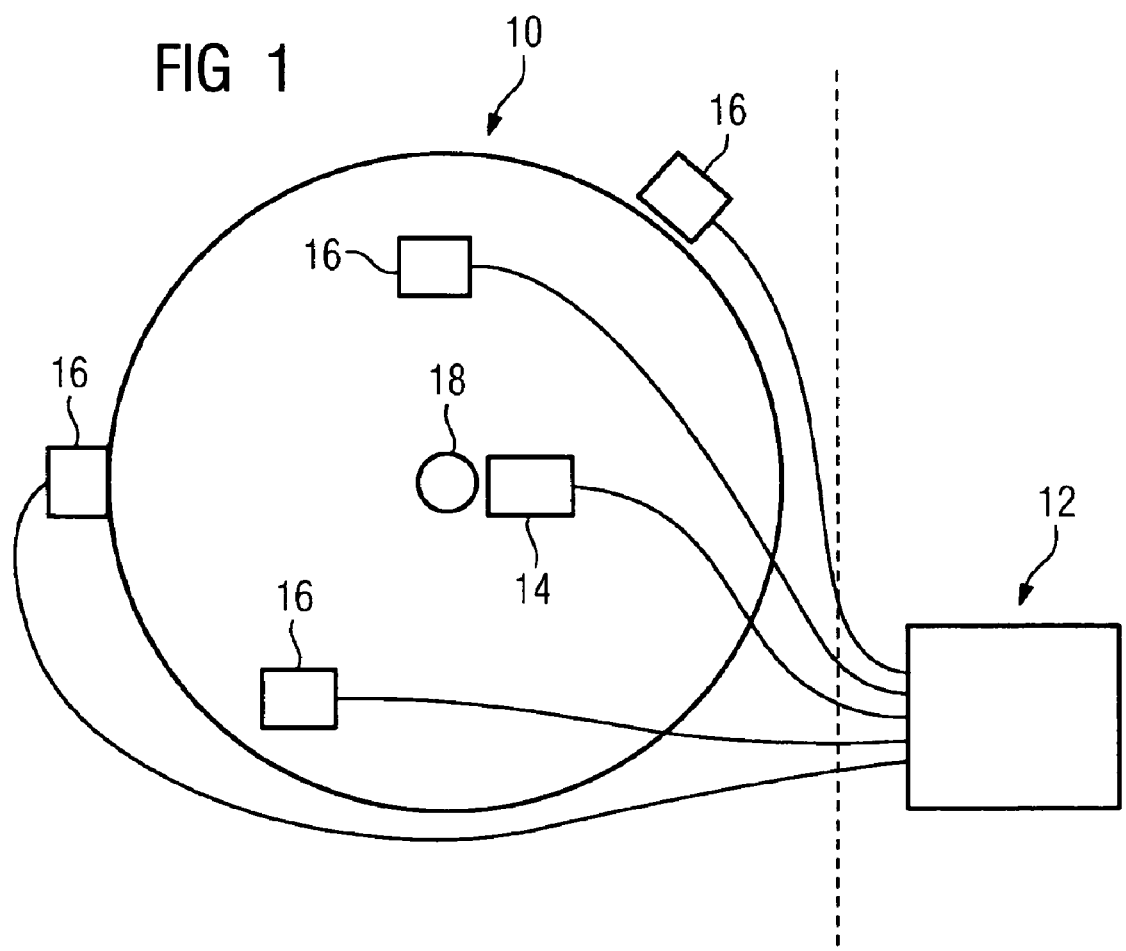

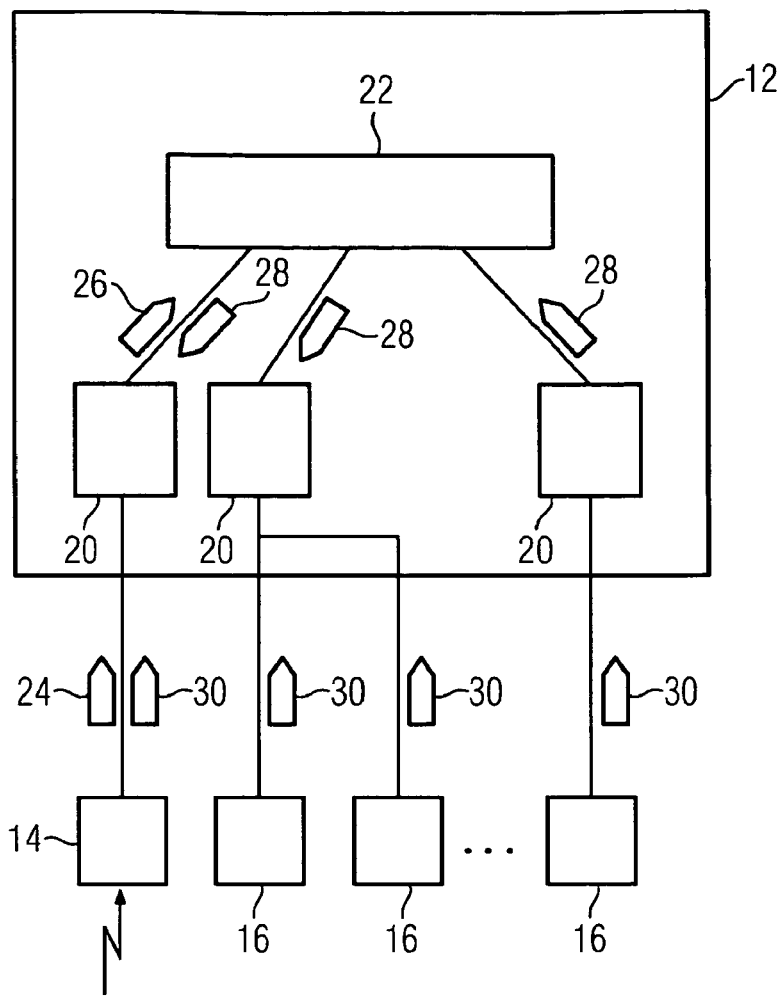
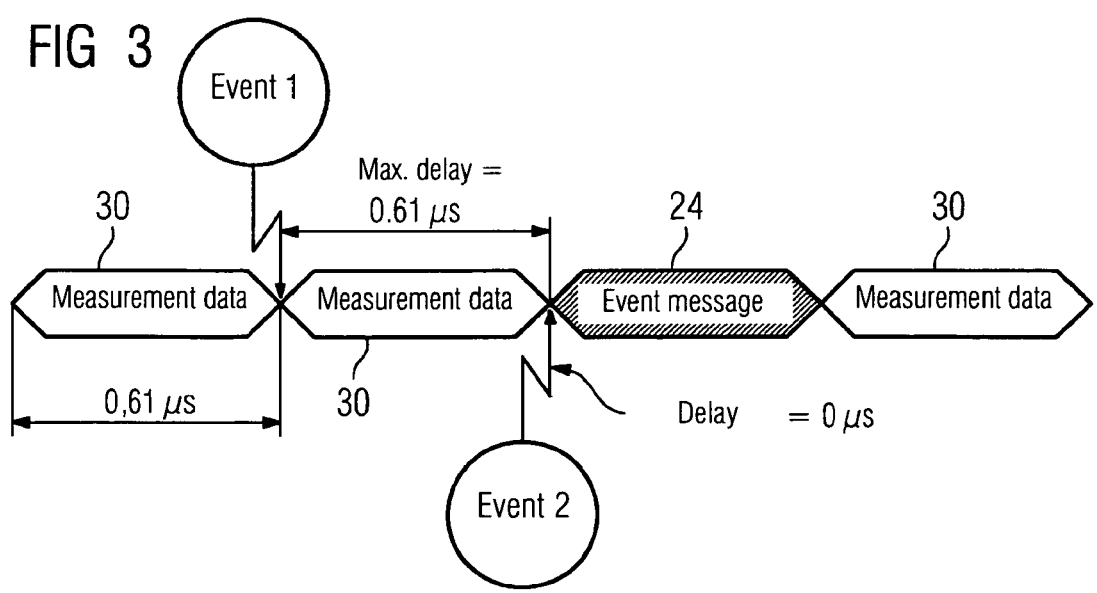

METHOD FOR OPERATING AN AUTOMATION SYSTEM

CROSS REFERENCE TO RELATED APPLICATIONS

This application is the U.S. National Stage of International Application No. PCT/EP2006/069824, filed Dec. 18, 2006 and claims the benefit thereof. The International Application claims the benefits of German application No. 10 2005 061 212.1 DE filed Dec. 21, 2005, both of the applications are incorporated by reference herein in their entirety.

FIELD OF INVENTION

The invention relates to a method for operating an automation system comprising at least two measurement modules, each of which is connected to a higher-ranking processing unit for the purpose of communication therewith. Automation systems of said kind are generally known in a wide variety of different configurations.

SUMMARY OF INVENTION

There is described a method for operating an automation system by means of which simultaneous or at least essentially simultaneous event processing is possible.

This object is achieved according to the invention by means of the features of an independent claim. For that purpose it is provided in the case of a method for operating an automation system comprising at least two measurement modules, each of which is connected to a higher-ranking processing unit for the purpose of communication therewith, that the higher-ranking processing unit is informed of an event that has been recorded via one of the at least two measurement modules and that the processing unit informs every accessible measurement module about the event.

Because the information about the occurrence of an event is forwarded to the higher-ranking processing unit, the occurrence of the event is known at a central level which can also be used for initiating further actions based on the occurrence of the event. The processing unit therefore notifies every accessible measurement module of the occurrence of the event. When this information is received at the or each measurement module, the respective measurement module can respond in an appropriate manner taking into account the information received, e.g. by starting a special measurement.

The dependent claims are directed at preferred embodiments of the present invention.

If the measurement modules are distributed measurement modules, the simultaneous or at least essentially simultaneous response to the occurrence of an event is also possible at spatially different locations, an aspect which is advantageous in particular for the monitoring of complex installations or large-volume machines such as e.g. a gas turbine.

The information about the event, which is to say the occurrence of an event, is preferably relayed to the processing unit on the one hand and to each measurement module on the other hand by means of a bus communication. This has the advantage that existing communication links can also be used for the event distribution method according to the invention.

In an advantageous embodiment the information about the event relayed to the processing unit also includes information relating to the time and/or origin of the underlying event. Additional information of this kind is advantageous in particular when information about said event arrives at the or each accessible measurement module, because on the basis of such additional information it is possible to initiate a specific response to the respective event and/or to differentiate between events which are fundamentally identical but which occurred at different times.

It is also advantageously provided that if a plurality of events, i.e. a first event and further events, occur simultaneously, the information about the event relayed to the processing unit also includes, in addition or alternatively, information about the further events. In this way, when information about either the first event or one of the other events is received, it is possible to assign said information uniquely to the event and to initiate a specific response thereto.

In a further advantageous embodiment of the invention it is provided that the bus communication takes place over a synchronous communication link. This has the advantage that the synchronicity that is implicitly associated with the respective communication link, i.e. that essentially is ensured by the underlying bus protocol in each case and the telegram processing geared thereto, also guarantees the simultaneous or at least essentially simultaneous reception of the information sent out by the processing unit to each accessible measurement module.

According to a further aspect of the invention it is provided that the information about the event is communicated by means of an event telegram having a predefined or predefinable yet constant length. In this way it is ensured that it is possible to foresee a period of time for responding to the occurrence of an event, which period of time varies at a maximum by the duration of a telegram processed at the moment of the occurrence of the event. In the case of telegrams having a constant length the period of time during which a bus is occupied by a telegram is determined on the one hand by the bandwidth, which is to say the transmission rate, and on the other hand by the length of the telegram. Bandwidth or transmission rate is constant. Thus, given a constant length of the telegram, the period of time during which a telegram already being processed at the time of the occurrence of an event occupies the bus in total is established. It is only during this period of time that a response to the occurrence of an event cannot be initiated immediately. A maximum delay resulting thereby is therefore associated directly with the length of the respective telegram. Given that the respective telegrams are of constant length, the processing of information about the occurrence of an event is determined overall. In a particularly preferred embodiment it is provided in this context that not just the event telegrams have a constant length, but that measurement telegrams possibly sent between individual event telegrams also have the same length relative to one another and in particular also in respect of the event telegrams.

The invention also relates to a computer program containing program code instructions which are executable by a computer for the purpose of implementing the method according to the invention. Lastly, the invention also relates to a computer program product, in particular a storage medium, on which a computer program of the aforesaid kind is stored or resides in some other appropriate manner.

The claims filed with the application are formulation proposals without prejudice for the attainment of more extensive patent protection. The applicant reserves the right to claim further feature combinations hitherto only disclosed in the description and/or drawings.

The or each exemplary embodiment is not to be understood as a limitation of the invention. Rather, numerous variations and modifications are possible within the scope of the present disclosure, in particular such variants and combinations which can be derived by the person skilled in the art with regard to the solution of the problem e.g. by combination or adaptation of individual features or elements or method steps in connection with those described in the general or special description part and contained in the claims and drawings and which, by combinable features, lead to a new subject matter or to new method steps or method step sequences, also insofar as they relate to manufacturing, testing and operating methods.

Back-references used in dependent claims point to the further development of the subject matter of the main claim by virtue of the features set forth in the respective dependent claim; they are not to be understood as a waiver of the attainment of an independent, objective protection for the feature combinations of the dependent claims to which they refer. Furthermore, with regard to an interpretation of the claims in the case of a more detailed concretization of a feature in a subordinate claim it is to be assumed that a restriction of said kind is not present in the respective preceding claims.

Since the subject matters of the dependent claims can form separate and independent inventions with regard to the prior art on the priority date, the applicant reserves the right to make them the subject matter of independent claims or division declarations. They may also contain autonomous inventions which have an embodiment that is independent of the subject matters of the preceding dependent claims.

BRIEF DESCRIPTION OF THE DRAWINGS

An exemplary embodiment of the invention is explained in more detail below with reference to the drawing. Objects or elements corresponding to one another are labeled with the same reference signs in all the figures, in which:

FIG. 1 is a schematically simplified representation of a technical system monitored by means of an automation system, FIG. 2 is a schematically simplified representation of an automation system provided for the purpose of monitoring the technical system, and FIG. 3 is a schematically simplified representation of a processing of an event by the automation system.

DETAILED DESCRIPTION OF INVENTION

FIG. 1 shows in a schematically simplified form a monitored technical system 10 based on the example of a gas turbine. The monitoring is performed by means of an automation system 12. The technical system 10, i.e. the gas turbine 10, is assigned a number of sensors 14, 16 which are provided for monitoring the technical system 10 and which record signals from the technical system 10 and forward them to the automation system 12. Among the sensors 14, 16, a first sensor 14, in the case of a gas turbine 10 as the monitored technical system, is assigned e.g. to a shaft 18 of the turbine 10 and provided for detecting a specific angle of rotation of the shaft 18. As soon as said specific angle of rotation has been detected by the first sensor 14, the first sensor 14 outputs a signal to this effect to the automation system 12. The automation system 12 thereupon initiates measures to start measurements by means of one or more further sensors 16. This is explained in more detail below with reference to FIG. 2. The presence of the monitored angle of rotation is therefore an event which is processed by the automation system 12. With the presence of the event, a telegram relating hereto is triggered by the first sensor 14, said telegram triggering the start of further measurements following the processing that is described below.

FIG. 2 shows the automation system 12 with further details. It can be seen therein that each sensor 14, 16 is connected to a measurement module 20. The connection between sensor 14, 16 and measurement module 20 can be one-to-one, such that precisely one sensor 14, 16 is connected to precisely one measurement module. Equally, it can be provided that a plurality of sensors 16, e.g. two sensors 16, are connected to one and the same measurement module 20. All the measurement modules 20 are in turn connected to a higher-ranking processing unit 22 for the purpose of communication therewith. Upon the occurrence of an event detected by one of the sensors 14, 16, which is to say e.g. upon detection of the monitored rotation angle of the shaft 18 (FIG. 1), the respective sensor, which is to say e.g. the first sensor 14, sends information relating hereto via the respective measurement module 20 to the central processing unit 22. Upon receiving such information, the central processing unit 22 informs every accessible measurement module, i.e. on the one hand the measurement module via which the information relating to the presence or occurrence of the event was received, and on the other hand all further measurement modules 20, about the event. In this regard FIG. 2 shows a first event telegram 24 which is transmitted by the first sensor 14 to the respective measurement module 20 for the purpose of informing the latter about the occurrence or presence of an event. A further event telegram 26 is shown to represent the corresponding information transfer from the measurement module 20 to the higher-ranking processing unit 22. When the processing unit 22 informs each measurement module 20 about the event, it issues corresponding event telegrams which are designated by the reference numeral 28 in FIG. 2.

With the receipt of said event telegrams 28 on the part of the measurement modules 20, the latter, taking the respective event telegram 28 into account, can start specific measurements in order e.g. to be able to record vibrations of the turbine 10 from the monitored rotation angle of the shaft 18, i.e. under defined framework conditions.

For the purpose of transmitting data in this connection, measurement telegrams 30 are provided which are shown in FIG. 2 between the respective sensor 14, 16 and the measurement module 20 assigned in each case. Measurement telegrams 30 of this kind can alternatively or additionally occur also in the communication between a measurement module 20 and the higher-ranking processing unit 22.

To further illustrate the method according to the invention, FIG. 3 shows a schematically simplified representation of the time relations during the event processing. According to this, it is assumed in an imaginary scenario that a first event occurs during the processing or transmission of measurement telegrams 30. If said event occurs immediately at the beginning of an already started transfer of a measurement telegram 30, the transfer of said measurement telegram is not interrupted for the sake of preserving the consistency of the transmitted data, possibly also because of boundary conditions to this effect due to the bus protocol, and the response to the event can only be initiated at the end of the transmission of the measurement protocol. As is also apparent from the schematically simplified representation in FIG. 3, however, the time required for transmitting a measurement protocol 30 is constant. In this case the duration of the transmission is the product in particular of the volume of data contained in the respective telegram, i.e. the measurement telegram, as well as, as will emerge in the following, also in the event telegrams 24 on the one hand and of the bandwidth of the transmission medium on the other hand. In the example shown, a time period of 0.61 microseconds is assumed for the transmission of a measurement telegram and/or an event telegram 30, 24. Thus, a maximum delay, i.e. a time period during which no response to an event is possible, also lasts 0.61 microseconds. If, though, an event occurs precisely at the end of the transmission of a measurement or event telegram 24, 30, the response to the event can be initiated immediately, resulting in a delay of 0 microseconds. For both constellations, following an exemplarily assumed transmission of two succeeding measurement telegrams 30, the transmission of an event telegram 24 in response to the event either immediately at the start of the second measurement telegram 30 or immediately at the end of the second measurement telegram 30 is shown. If an event were to occur at some other point in time during the transmission of the second measurement telegram 30, identical relations result. As shown in FIG. 3 and already mentioned hereintofore, the duration of the transmission of an event telegram 24 also corresponds to the duration of the transmission of a measurement telegram 30. Overall, therefore, determined relations are produced for periods of time during which no response to an event that has occurred can take place.

All in all, therefore, the present invention can be described as follows: A method for operating an automation system, in particular in the form of a measuring and/or monitoring system, is disclosed wherein for the purpose of distributing events to connected measurement modules 20 it is provided that a higher-ranking processing unit 22 is informed about an event which has been recorded via one of the measurement modules 20, and that the processing unit 22 informs every accessible measurement module 20 about the event. Thus, a preprocessing of each event signal referring back to an event takes place in a single measurement module 20 in each case. The event is then encoded in an event telegram which is delivered via a communication link that is present anyway in conventional automation systems to all the measurement modules 20, including that which performs the preprocessing, simultaneously and with a known delay with respect to the original event. If a plurality of events occur simultaneously, this is indicated by means of an encoding in the event telegram. A signal is generated from the event telegram by hardware logic in each accessible measurement module 20, the evaluation of which signal together with an underlying event coding conveying an inference about the source and time of the original event. Thus, the essential advantage of the invention results from the fact that any measurement module 20 can be correlated with any event in the overall system without any hardware configuration.

An automation system operating according to the method therefore constitutes overall a device for precisely timed relaying of events to many measurement modules 20 in particular in distributed systems, with measurements being based on event-related methods. The device can be used for an arbitrary number of event sources without the need for hardware expansions or hardware configuration measures. The method can also be used in particular for clock synchronization in distributed measuring systems.

The invention claimed is:

1. A method for operating an automation system, comprising:
providing at least two measuring modules, wherein each measuring module is connected to a higher-ranking processing unit for communicating with the higher-ranking processing unit;
informing the higher-ranking processing unit of an event which has been recorded via one of the at least two measuring modules; and
informing every accessible measuring module about the event by the higher-ranking processing unit,
wherein information about the event is relayed to the processing unit and to each measuring module via a bus communication,
wherein the information about the event is communicated based on an event telegram with a constant, predefined or pre-definable length, and
wherein a transmission of the event telegram is integrated into transmissions of measurement telegrams between the measuring modules and/or a measuring module and the processing unit, and
wherein event telegrams and measurement telegrams have a same length.

2. The method as claimed in claim 1, wherein the measurement modules are distributed measurement modules.

3. The method as claimed in claim 1, wherein the information about the event relayed to the processing unit includes information relating to the time.

4. The method as claimed in claim 1, wherein the information about the event relayed to the processing unit includes information relating to an origin of the underlying event.

5. The method as claimed in claim 1, wherein if a plurality of events occur simultaneously, the information about the event relayed to the processing unit also includes information about the other events.

6. The method as claimed in claim 1, wherein the bus communication takes place over a synchronous communication link.

7. A non-transitory computer readable medium containing computer instructions stored therein for causing a computer processor to perform a method comprising:
informing a higher-ranking processing unit of an event which has been recorded via one of at least two measuring modules; and
informing every accessible measuring module about the event by the processing unit,
wherein information about the event is relayed to the processing unit and to each measuring module via a bus communication,
wherein the information about the event is communicated based on an event telegram with a constant, predefined or pre-definable length, and
wherein a transmission of the event telegram is integrated into transmissions of measurement telegrams between the measuring modules and/or a measuring module and the processing unit, and
wherein event telegrams and measurement telegrams have a same length.

8. The non-transitory computer readable medium as claimed in claim 7, wherein the measuring modules are distributed measuring modules.

9. The non-transitory computer readable medium as claimed in claim 8, wherein the information about the event relayed to the processing unit includes information relating to time and origin of the event.

* * * * *